UNITED STATES PATENT OFFICE.

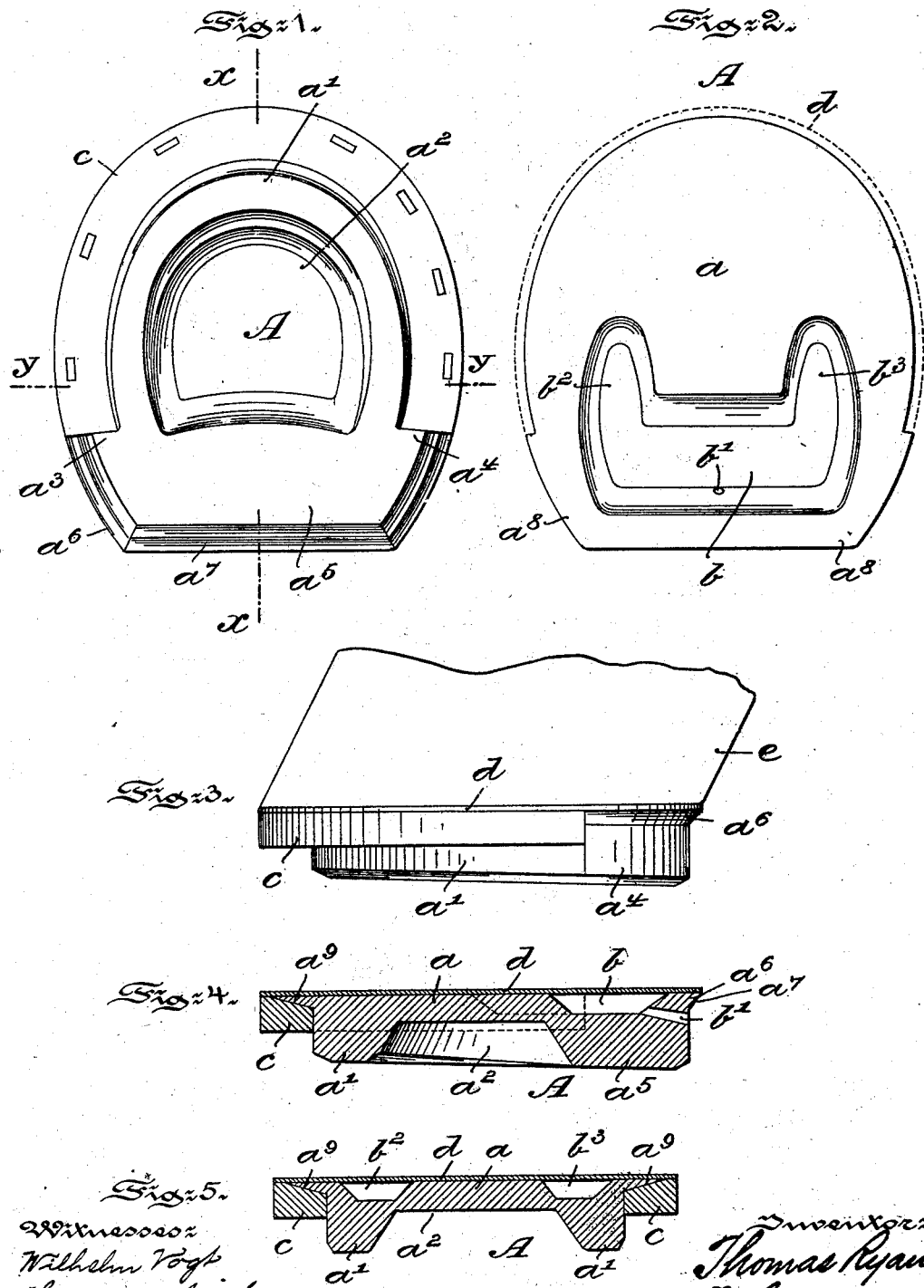

THOMAS RYAN, OF GERMANTOWN, PENNSYLVANIA.

YIELDING HOOF-PAD.

SPECIFICATION forming part of Letters Patent No. 705,615, dated July 29, 1902.

Application filed April 4, 1902. Serial No. 101,324. (No model.)

*To all whom it may concern:*

Be it known that I, THOMAS RYAN, a citizen of the United States, residing at Germantown, in the county of Philadelphia and State of Pennsylvania, have invented certain new and useful Improvements in Yielding Horse-Hoof Pads, of which the following is a specification.

My invention has relation to an improved yielding or elastic pad intended to be employed with a horseshoe in application to a horse's hoof to prevent slipping in frosty or slippery weather and a pad in which the frog of the natural hoof is protected against navicular and other similar diseases of the hoof which animals, such as horses, are heir to under certain conditions, due mainly to the fact that a rubber pad with a shoe employed in connection therewith when applied to the foot bears upon the frog in such a manner as to maintain the same under constant pressure while the animal is standing or manipulating the limbs in moving about in a stall or other place of location.

The principal object of my invention is to provide a simple and effective yielding or elastic pad for use with a metal horseshoe for horses' feet in which the frog is carefully protected in use against pressure, particularly in the rear of the feet, where usually the feet are constantly subjected to the greatest strain due to constant pounding of the feet of the animal in standing, the rear portion of the pad acting, as it were, as a bellows between the hoof and the pad for supplying the requisite amount of air to always cushion the frog and maintain it in a healthier condition than hitherto it could be maintained, and also avoiding thereby navicular or similar diseases due to the yielding nature of the heel portion of the pad by the particular arrangement in the upper surface of an air-cushion for relieving strain on the frog of the animal's hoof.

My invention, stated in general terms, consists of a yielding horse-hoof pad constructed and arranged in substantially the manner hereinafter described and claimed.

The nature, characteristic features, and scope of my present invention will be more fully understood from the following description, taken in connection with the accompanying drawings, forming part hereof, in which—

Figure 1 is a top or plan view of a yielding or elastic pad for a horse's hoof embodying the particular features of my invention, showing the metal shoe employed therewith and suitably nailed thereto and through a leather strip into the horse's hoof. Fig. 2 is a similar view of the reverse face of the pad or of that occupying a position in use next to the hoof of the horse, showing the shape of the depression adapted to reduce the pressure upon the frog of the hoof and for cushioning and ventilating that part of the horse's hoof adjacent to or about the frog thereof. Fig. 3 is a side elevational view of the pad with its metal shoe shown applied to the hoof of a horse and also showing the condition of the pad with its shoe in actual use. Fig. 4 is a longitudinal central sectional view on the line $x\,x$ of Fig. 1, showing the particular arrangement of the pad in the rear or heel portion thereof; and Fig. 5 is a transverse sectional view on the line $y\,y$ of Fig. 1, showing the particular arrangement of the back of the pad in the heel portion and location of the metal shoe and leather or similar packing interposed between the upper face of the pad and hoof of the animal.

Referring to the drawings, A represents the pad, made of rubber or other suitable yielding or elastic material. From the body $a$ of the pad in a downward direction is a projection $a'$, which is preferably of an inverted-U shape, and with a depression $a^2$ between the curved wall thereof and said projection, forming the bearing-surface for the horse's hoof upon the ground or roadway. This wall or bearing-surface is offset on both sides at $a^3$ and $a^4$ into a transverse solid and flat projection $a^5$, constituting the heel portion of the pad, and with a rim $a^6$, slightly inclined on one side at $a^7$ and flat on the other side at $a^8$, as illustrated in Figs. 1 and 2, to form as to the side $a^8$ a bearing-surface in the rear of the side walls of the animal's hoof therewith and as to the side $a^7$ a defined finish to the pad in the rear in application to the hoof.

In the upper face of the pad, coming next to the hoof in use and in the rear portion of the same, is formed a substantially U-shaped indentation or depression $b$, constituting a chamber having two contracted extensions $b^2$ and $b^3$ in outline from the main portion of said chamber, contouring substantially with the shape of the frog of the hoof, so that the latter will normally be free of the frog, and when pressure is exerted by the pounding of the animal will not only by the yielding of the pad cushion the frog, but also provide an air-chamber to maintain the frog at all times in a healthy condition, thereby freeing the animal's hoof as far as possible from navicular or similar diseases to which animals, such as horses, are heir under certain conditions, and avoiding, furthermore, under constant pressure about the frog, softening or decay of the same, and thus possible lameness of the animal.

In the heel portion $a^5$ of the pad A is provided an air inlet and outlet opening or passage $b'$, which supplies air from the outside of the pad to the chamber $b$, whereby in the pounding of the feet of the animal with the pads applied thereto the frogs will be cushioned against bruising and in the stamping and cushioning the air will be forced out, and when the pressure is lessened automatically the air will be sucked in through the opening or passage $b'$ into the chamber $b$, again to thereby maintain the hoof about the frog at all times in a comparatively cool condition, and hence more healthy than it could possibly be otherwise with a pad without such a cushioning and ventilating chamber $b$, having a combined air inlet and exit opening or passage $b'$ in the wall thereof.

$c$ is the metal shoe fitting the preferably inclined rim $a^9$ of the body $a$ of the pad A and which rim is disposed about the projection $a'$ of the same, and nails pass through it and through a leather or other material strip $d$, if preferred, interposed between the animal's hoof $e$ and pad A, as clearly illustrated in Fig. 3. In this view in particular the condition of the foot with the projection $a'$ of the pad below the metal shoe $c$ is clearly shown and by which arrangement it will be observed that considerable wear of the pad may occur before it is brought into a plane with the metal shoe $c$ to be rendered ineffectual for safe use on the animal.

The pad as illustrated in Fig. 3 in application to the horse's hoof not only insures a neat-fitting and sightly-looking shoe and pad, but also one in which greater comfort to the animal is obtained and appreciably lessens any tendency to frog or navicular diseases of the hoof and even softening or decay of the hoof, with its resultant attending lameness of the animal.

It will be seen from Figs. 2, 4, and 5 that the pad by being offset at $a^3$ and $a^4$ permits the leather strip $d$ to project beyond the periphery of the pad from the heel portion $a^5$ throughout the sides and front of the pad, so that the metal shoe $c$ may be so located as to partly rest in position not only upon the inclined ledge or rim $a^9$, but also upon the face of the projecting leather strip interposed between the hoof $e$ and the pad A, to thereby insure greater security of the shoe $c$ to the hoof $e$, as well as a yielding support, and hence greater comfort by such an arrangement of the pad to the animal's hoof, as will be clearly understood from Fig. 3 of the drawings.

Having thus described the nature and object of my invention, what I claim as new, and desire to secure by Letters Patent, is—

A horse-hoof pad, whereof one surface is provided with a recessed projection and solid heel portion and whereof the other surface is provided with a flat face merging into a wide chamber having end contracted extensions and a combined inlet and outlet passage in the wall of said heel portion, in combination with a leather strip applied to one face of said pad, and a metal shoe in position bearing on the projection of said pad and leather strip beyond the periphery of said pad, substantially as and for the purposes described.

In testimony whereof I have hereunto set my signature in the presence of two subscribing witnesses.

THOMAS RYAN.

Witnesses:
J. WALTER DOUGLASS,
THOMAS M. SMITH.